United States Patent
Breton et al.

[11] Patent Number: 5,938,827
[45] Date of Patent: Aug. 17, 1999

[54] INK COMPOSITIONS

[75] Inventors: Marcel P. Breton; Fereshteh Lesani; Danielle C. Boils; James D. Mayo, all of Mississauga, Canada

[73] Assignee: Xerox Corporation, Stamford, Conn.

[21] Appl. No.: 09/017,072

[22] Filed: Feb. 2, 1998

[51] Int. Cl.$^6$ .................................... C09D 11/02
[52] U.S. Cl. ................... 106/31.43; 106/31.48; 106/31.52; 106/31.58; 106/31.75
[58] Field of Search ............. 106/31.43, 31.48, 106/31.52, 31.58, 31.75

[56] References Cited

U.S. PATENT DOCUMENTS

| | | | |
|---|---|---|---|
| 4,308,547 | 12/1981 | Lovelady et al. | 346/140 R |
| 4,697,195 | 9/1987 | Quate et al. | 346/140 R |
| 4,797,693 | 1/1989 | Quate | 346/140 R |
| 4,840,674 | 6/1989 | Schwarz | 106/31.43 |
| 4,853,036 | 8/1989 | Koike et al. | 106/31.58 |
| 5,006,170 | 4/1991 | Schwarz et al. | 106/31.29 |
| 5,028,937 | 7/1991 | Khuri-Yakub et al. | 346/140 R |
| 5,041,161 | 8/1991 | Cooke et al. | 106/31.3 |
| 5,111,220 | 5/1992 | Hadimioglu et al. | 346/140 R |
| 5,121,141 | 6/1992 | Hadimioglu et al. | 346/140 R |
| 5,122,187 | 6/1992 | Schwarz et al. | 106/31.29 |
| 5,124,718 | 6/1992 | Koike et al. | 346/1.1 |
| 5,128,726 | 7/1992 | Cassano et al. | 355/308 |
| 5,254,159 | 10/1993 | Gundlach et al. | 106/31.43 |
| 5,258,064 | 11/1993 | Colt | 106/31.43 |
| 5,371,531 | 12/1994 | Rezanka et al. | 347/43 |
| 5,389,131 | 2/1995 | Colt et al. | 106/31.43 |
| 5,389,133 | 2/1995 | Gundlach et al. | 106/31.43 |
| 5,531,815 | 7/1996 | Gundlach et al. | 106/31.43 |
| 5,554,213 | 9/1996 | Radigan, Jr. et al. | 106/31.43 |

OTHER PUBLICATIONS

IBM Technical Disclosure Bulletin, vol. 16, No. 3, Sep. 1973, pp. 1169 and 1170, "Tactile Display System", N.C. Loeber et al.

*Primary Examiner*—Helene Klemanski
*Attorney, Agent, or Firm*—E. O. Palazzo

[57] ABSTRACT

An ink composition containing a mixture of two black colorants, a vehicle, betaine, and N,N'-bis(3-aminopropyl) ethylenediamine.

9 Claims, No Drawings

INK COMPOSITIONS

PENDING APPLICATIONS

The following applications, the disclosures of each being totally incorporated herein by reference, are being filed concurrently herewith.

U.S. Ser. No. 09/017,533 relating to an aqueous ink containing a dissipatible polymer, colorant and a zwitterionic component like betaine;

U.S. Ser. No. 09/017,459 relating to an ink containing a colorant, polymer, such as a dissipatible polymer, vehicle, and a salt of polyacrylic, a salt of polyamic acid, a salt of alginic acid, or mixtures thereof;

U.S. Ser. No. 09/017,537 relating to an ink containing a resin of a dissipatible sulfonated polyester terminated with acrylic or methacrylic acid groups; and U.S. Pat. No. 5,863,320 relating to an ink containing a perfluoro surfactant additive.

The appropriate components and processes of the above applications may be selected for the present invention in embodiments thereof.

BACKGROUND OF THE INVENTION

The present invention is directed to ink compositions and, more specifically, the present invention relates to acoustic inks especially useful for acoustic ink printing, processes and apparatuses, reference for example U.S. Pat. No. 5,121,141, U.S. Pat. No. 5,111,220, U.S. Pat. 5,128,726, and U.S. Pat. No. 5,371,531, the disclosures of which are totally incorporated herein by reference, including especially acoustic ink processes as illustrated in the aforementioned copending applications and patents, such as an acoustic ink printer for printing images on a record medium.

The present invention is generally directed to aqueous ink compositions. More specifically, the present invention is directed to colorant, such as dye based aqueous ink compositions particularly suitable for use in ink jet printing processes, and especially acoustic ink jet processes, and wherein paper curl and image smearing is minimal, or avoided. The ink compositions of the present invention possess excellent waterfastness and high optical density on plain paper, particularly when the inks are used in printers with heat and delay printing process. More specifically, the inks of the present invention minimize or reduce imaging smearing with or without the assistance of a dryer, provide for increased paper selection latitude, and the inks are substantially stable to environmental changes, such as stability to heat, freezing, and a combination thereof. In embodiments, the present invention relates to imaging processes with ink jet inks comprised of water, a colorant, such as dye mixture, a humectant such as betaine or its derivatives, and a waterfastness additive such as N,N' bis (3-aminopropyl) ethylenediamine. Images developed with the inks of the present invention in embodiments enable ink jet prints of excellent resolution, high optical density, excellent waterfastness, minimum or very low showthrough, and excellent edge raggedness or mid-frequency line edge noise, MFLEN.

PRIOR ART

In acoustic ink printing, the printhead produces approximately 2.2 picoliter droplets by an acoustic energy process. The ink under these conditions should preferably display a viscosity of about 5 to about 10 centipoise or less at the jetting temperature. Furthermore, once the ink is jetted onto the paper, the ink image should be of excellent crease property, and should be nonsmearing, waterfast, of excellent transparency and excellent fix qualities.

Ink compositions for ink jet printing are known. For example, U.S. Pat. No. 4,840,674, the disclosure of which is totally incorporated herein by reference, there is illustrated an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, and which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, there is illustrated an ink jet ink which is semi-solid at room temperature. These inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of about 45° C. to about 110° C., at which temperature the ink has a viscosity of about 10 to 15 centipoise. The inks also contain 0.1 to 30 weight percent of a colorant system.

U.S. Pat. No. 4,853,036 and U.S. Pat. No. 5,124,718 disclose an ink for ink jet recording which comprises a liquid composition comprising a coloring material, a volatile solvent having a vapor pressure of 1 millimeter Hg or more at 25° C., and a material being solid at room temperature and having a molecular weight of 300 or more, and prepared so as to satisfy the formula B1/A1o3. An ink jet recording process using the ink is also disclosed.

U.S. Pat. No. 5,254,159 discloses ink compositions which contain water, a single anionic dye, and a compound selected for example, from the group consisting of N,N'-bis(3-aminopropyl) 1,2 ethylenediamine, 1,4-bis(3-aminopropyl) piperazine, and N,N'-bis(2-aminoethyl)1,3-propanediamine.

SUMMARY OF THE INVENTION

While the known ink compositions and processes may be suitable for their intended purposes, a need remains for acoustic hot melt ink compositions suitable for acoustic and thermal ink jet printing. Additionally, there is a need for aqueous ink compositions suitable for ink jet printing processes wherein the substrate is heated prior to printing and is cooled to ambient temperature subsequent to printing (heat and delay printing processes). There is also a need for ink compositions suitable for ink jet printing wherein high optical densities, that is greater than about 1.5 can be achieved with relatively low dye concentrations. A need also remains for ink compositions suitable for ink jet printing wherein curling of the substrate, such as paper, subsequent to printing is minimized, or avoided. These and other needs can be achievable with the inks of the present invention in embodiments thereof.

Examples of features of the present invention include, for example:

It is an feature of the present invention to provide aqueous ink compositions with many of the advantages illustrated herein.

It is another feature of the present invention to provide aqueous ink compositions suitable for acoustic ink jet printing.

It is yet another feature of the present invention to provide aqueous ink compositions which are compatible with a wide variety of plain papers, and provide developed images with excellent sheen, acceptable luster, and improved optical densities, in examples greater than about 1.5 OD.

It is still another feature of the present invention to provide aqueous ink compositions which generate high quality images on plain papers, and which inks possess a high optical density of for example at least 1.4 on a variety of substrates and as above 1.5 on selected substrates.

Another feature of the present invention is to provide aqueous ink jet ink compositions which possess a low viscosity of, for example, 0.8 to 10 centipoise at 25° C.

Yet another feature of the present invention is to provide aqueous jet ink compositions which exhibit low viscosity of from about 0.8 to about 5 centipoise at a temperature of from about 25° C. to about 45° C.

Still another feature of the present invention is to provide aqueous ink jet ink compositions which exhibit minimal intercolor bleed.

It is another feature of the present invention to provide aqueous ink jet ink compositions which exhibit excellent image permanence.

Another feature of the present invention is to provide ink compositions suitable for ink jet printing wherein high optical densities can be achieved with relatively low dye concentrations.

Another feature of the present invention resides in the provision of aqueous inks wherein the viscosity of the ink is from about 1 centipoise to about 10 centipoise at, for example, the jetting temperature which can be from about 25° C. to about 50° C., and preferably from about 35° C. thereby enabling excellent jetting at reasonable power levels.

The present invention relates to an ink composition comprised of a mixture of colorants, and an ink vehicle, and optional known ink additives, and which inks preferably possesses an optical density of at least about 1.5 on a variety of substrates, and a viscosity of for example, from about 1 centipoise to about 10 centipoise at a temperature of from about 25° C. to about 50° C.

DETAILED DESCRIPTION OF THE INVENTION

In embodiments the ink compositions of the present invention comprise a mixture of dyes or pigments, and more specifically a mixture of dye colorants, especially two black dyes, an ink vehicle, and a waterfastness additive of N,N'-bis(3-aminopropyl)ethylenediamine preferably a humectant or curl reduction additive like betaine, a carboxy methyl trimethyl ammonium hydroxide, and which inks posses for example, an optical density of at least about 1.5 and more specifically from about 1.6 to about 2.

Of importance with respect to the present invention is the incorporation colorants, especially into the ink of a waterfast compound and a mixture, preferably two black dyes, and wherein one dye is present in an amount of from about 1 to about 99, and preferably from about 40 to about 60 weight percent, and the second dye is present in an amount of from about 1 to about 99 and preferably from about 40 to about 60 weight percent based on the total amount of solids.

Examples of suitable dyes include reactive dyes, direct dyes, anionic dyes, acid dyes, food dyes, and the like. Specific examples of suitable dyes include mixtures of the ProJet dyes available from Zeneca (ICI) such as, ProJet Fast Magenta 2, ProJet Fast Black 2 ProJet Fast Yellow 2, ProJet Fast Cyan 2, and ProJet Fast Black 2-CF1 with less waterfast dyes such as ProJet Yellow 1 G, ProJet Yellow OAM, ProJet Cyan 1, ProJet Magenta 3B-OA, ProJet Magenta 1T, ProJet Magenta 1, and ProJet Black OA-PZ. Other dyes are also suitable in embodiments of this invention such as preferably: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brilliant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow and CA51089FW, available from Bayer, Acid Yellow 17, available from Tricon. Of importance to the inks of the present invention is the selection of a mixture of two black dyes, which dyes may co-crystallize in the presence of the ethylenediamine to enable improved ink characteristics, such as excellent print quality and reduced paper curl.

Examples of the liquid vehicle selected for the inks include water, or may comprise a mixture of water and a miscible organic component, such as betaine, ethylene glycol, propylene glycol, diethylene glycols, glycerin, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 40 to about 99.5 percent by weight, preferably about 55 to about 95 percent by weight, and more preferably from about 60 to about 90 percent by weight, although the amount may be outside these ranges in embodiments. Also, there can be selected other vehicles not specifically recited herein.

When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The nonwater component of the liquid vehicle generally serves as a humectant which has a boiling point higher than that of water (100° C.).

Optional ink additives include biocides, such as Dowicil 150, 200, and 75, benzoate salts, sorbate salts, and the like, present in effective amounts, such as for example an amount of from about 0.0001 to about 4 percent by weight, and preferably from about 0.01 to about 2.0 percent by weight; pH controlling agents such as acids; or bases, phosphate salts, carboxylates salts, sulfite salts, amine salts, and the like, present, for example, in an amount of from 0.01 to about 1 percent by weight and preferably from about 0.01 to about 1 percent by weight, based on the weight of the ink components.

The inks of the present invention can be prepared by any suitable method. For example, the inks can be prepared by gently stirring or shaking the individual components, such as mixing the vehicle with the humectant and the colorant mixture at room temperature, or at a temperature of from about 25° C. to 50° C., followed by cooling to about 25° C.; and thereafter adding the waterfast amine and optional ink additives.

The inks of the present invention are particularly suitable for printing processes wherein the substrate, such as paper, transparency material, or the like, is heated during the printing process to facilitate rapid precipation of the dye mixture. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

Also, the present invention relates to a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, and wherein the ink contains a mixture of dyes and the waterfast amine complexing compound, and which ink possesses a viscosity of from about 1 centipoise to about 10 centipoise at a temperature of from about 25° C. to about 50° C., viscosity of from about 1 centipoise to about 5 centipoise at a temperature of from about 25° C. to about 50° C., and (b) causing droplets of the ink to be ejected onto a recording sheet in an imagewise pattern at a temperature of from about 25° C. to about 50° C.

The inks of the present invention are also particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against features upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. This causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive primarily because it does not require the nozzles or the small ejection orifices which have caused many of the reliability and pixel placement accuracy problems that conventional drop on demand and continuous stream ink jet printers have suffered.

The size of the ejection orifice is an important design parameter of an ink jet because it determines the size of the droplets of ink that the jet ejects. As a result, the size of the ejection orifice cannot usually be increased without sacrificing resolution Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures ( for example, about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

Embodiments of the present invention include:

an ink composition comprised of black colorants, a vehicle, and N,N'-bis(3-aminopropyl)ethylenediamine;

an ink composition comprised of a mixture of black dyes, a vehicle, betaine and N,N'-bis(3-aminopropyl) ethylenediamine;

an ink with two black dyes, and ink additives;

an ink which contains a first black dye in an amount of from about 1 to about 99 weight percent and a second black dye in an amount of from about 1 to about 99 weight percent;

an ink which contains a first black dye in an amount of from about 40 to about 60 weight percent and a second black dye in an amount of from about 60 to about 40 weight percent;

an ink with two dyes present in the ink in an amount of from about 1 to about 20 weight percent, and the additive is betaine;

an ink wherein a mixture of dyes is present in the ink in an amount of from about 2 to about 12 weight percent;

an ink wherein the black dye mixture is comprised of BASF X-34 and Zeneca Projet Fast Black 2 of the formulas:

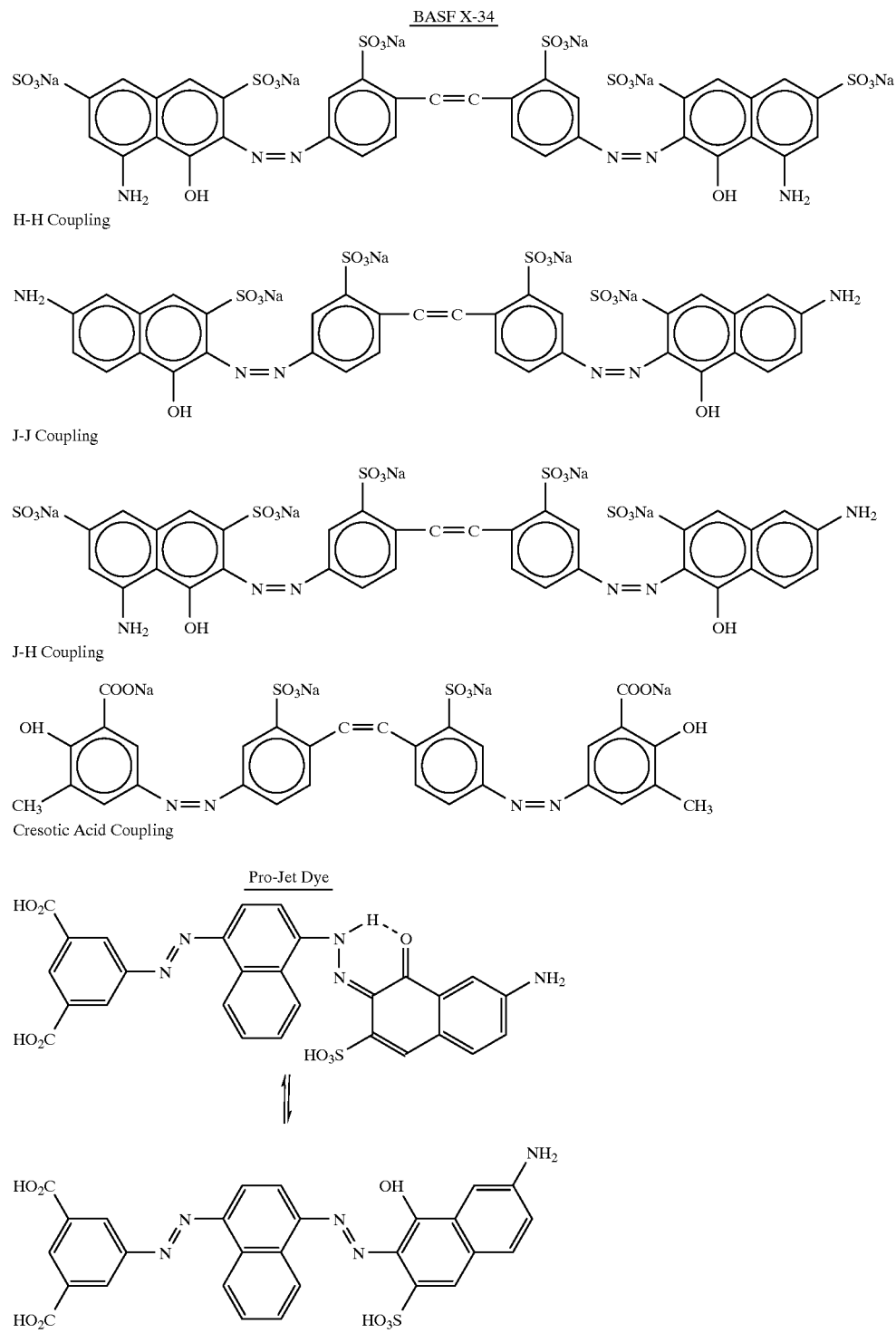

-continued

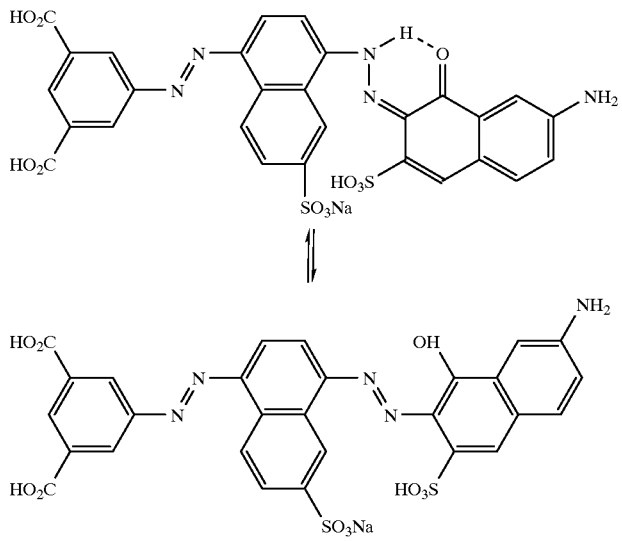

an ink wherein the vehicle is water;

an ink wherein the water is deionized water;

an ink wherein the vehicle is present in an amount of about 50 to about 95 weight percent;

an ink wherein the ethylenediamine is present in an amount of about 0.5 to about 10 weight percent;

an ink wherein the ethylenediamine is present in an amount of about 1 to about 4 weight percent;

an ink wherein the ethylenediamine is present in an amount of about 1 to about 4 weight percent and which ink possesses a viscosity of from about 1 centipoise to about 10 centipoise at a temperature of from about 25° C. to about 50° C.;

an ink composition with a viscosity of from about 1 centipoise to about 10 centipoise at a temperature of from about 25° C. to about 50° C.;

an ink composition with a dye of cyan, magenta, yellow, blue, green, brown, or mixtures thereof; an ink wherein the mixture of dyes is present in the ink in an amount of from about 1 to about 20 with percent and the betaine is present in an amount of 1 to about 20 weight percent, and which ink possesses a viscosity of from about 1 centipoise to about 20 centipoise, and (b) causing droplets of said ink to be ejected onto a recording sheet in an imagewise pattern, said two black colorants comprise a printing process which comprises incorporating into an acoustic ink jet printer an ink comprised of black colorants, a betaine vehicle, and N,N'-bis(3-aminopropyl) ethylenediamine, and causing droplets of the ink to be ejected in imagewise pattern onto a substrate;

a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a mixture of black dyes, a vehicle, and N,N'-bis(3-aminopropyl)ethylenediamine, and which ink possesses a viscosity of from about 1 centipoise to about 10 centipoise at a temperature of from about 25° C. to about 50° C., and (b) causing droplets of said ink to be ejected onto a recording sheet in an imagewise pattern at a temperature of from about 25° C. to about 50° C.;

an ink wherein the ink additives are comprised of glycols, humectants, and biocides;

an ink wherein the dyes are BASF X-34 (mixture of four dyes as a result of synthesis)

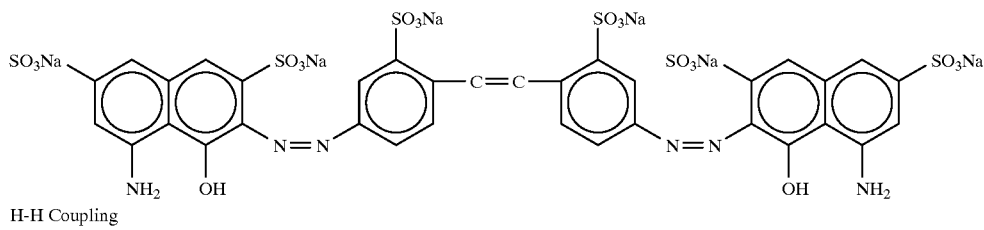

H-H Coupling

-continued
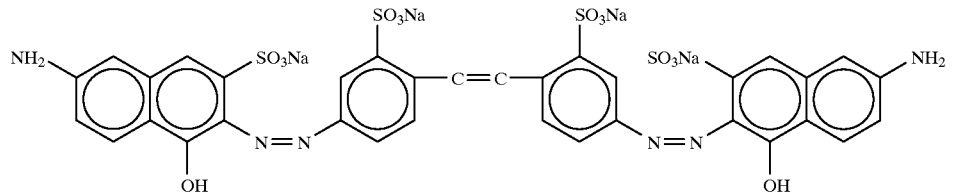
J-J Coupling
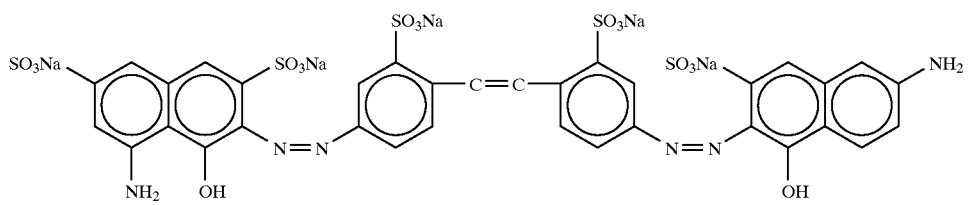
J-H Coupling
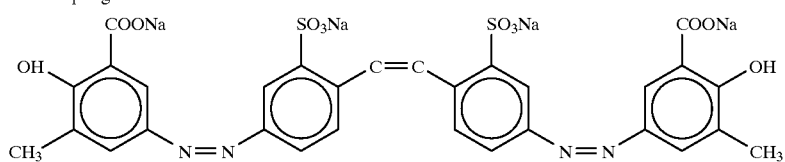
Cresotic Acid Coupling; and
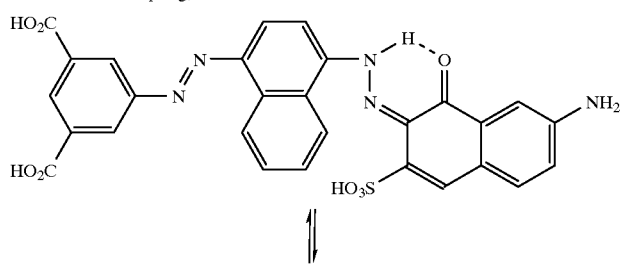
⇅
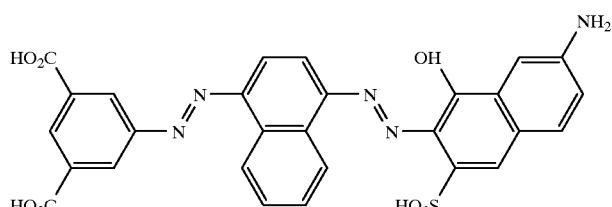
⇅
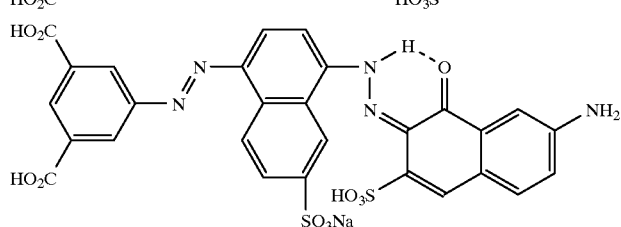

In the following examples, the viscosity of each ink was obtained at room temperature, about 25 degrees Centigrade, with a Brookfield model LVTD viscometer and the surface tension was measured with a Krüss surface tensiometer model K10. The inks were then utilized, or printed in an HP1600C, the HP cartridges being filled with the inks indicated. The optical density (OD) was determined by Macbeth TR925 Spectrophotometer, the edge raggedness or mid-frequency line edge noise (MFLEN) and the intercolor bleed (ICB) data were obtained with a computerized image analysis technique. The waterfastness (WF) data were obtained on prints that were left at room temperature for about 24 hours and then were soaked in tap water for a period of 5 minutes while stirring at moderate speed. The soaked prints were then air dried for 24 hours. The differences in optical densities before and after the immersion in water provided a measure of the waterfastness. The change in optical density is expressed in percent for the following examples (see Table 1).

EXAMPLE I 28-1 (Ink Contains Only Basacid X-34):

An ink composition was formulated as follows. In a bottle was measured 66.5 g of water and 15 g of betaine cosolvent to minimize paper curl (obtained from Aldrich Chemical Co., Milwaukee, Wis.). The mixture was magnetically stirred for 5 minutes. To this mixture was added 12.5 grams of Basacid X-34 process black dye (33.5 weight percent solid content, obtained from BASF Wyandotte Corp., Holland, Mich.) and this mixture was stirred for another 5 minutes. There was then added 0.58 g of N,N'-bis(3-aminopropyl)ethylenediamine (obtained from Aldrich Chemical Co., Milwaukee, Wis.) and it (the resulting mixture) was stirred for 5 minutes. Subsequently 1.12 grams of ammonium chloride (obtained from Fisher Scientific Co., Fairlawn, N.J.) was added to the mixture, and it was stirred for another 5 minutes. The pH of the ink formulation was adjusted to 8.7 by the addition of 4.3 g of 3 molar hydrochloric acid. The final ink which was comprised of 4.19% by weight of Basacid X-34, 15% by weight of betaine, 0.58% (percent by weight throughout) by weight of N,N'-bis(3-aminopropyl)ethylenediamine and 1.12% by weight of ammonium chloride in water, had a viscosity of 1.78 and surface tension of paper 4024 DP paper. The ink was 94% waterfast on the Xerox Corporation Image Series LX 4024 paper and 100% waterfast on the Xerox Corporation 4024 DP paper.

EXAMPLE II 28-3 (Ink Contains Only Basacid X-34):

An ink composition was formulated as follows. In a bottle was measured 66.5 g of water and 8 g of betaine (obtained from Aldrich Chemical Co., Milwaukee, Wis.). The resulting mixture was magnetically stirred for 5 minutes. To this mixture was added 16.3 g of Basacid X-34 process black dye (33.5 weight percent solid content, obtained from BASF Wyandotte Corp., Holland, Mich.) and followed by stirring for another 5 minutes. There was then added 0.98 g of N,N'-bis(3-aminopropyl)ethylenediamine (obtained from Aldrich Chemical Co., Milwaukee, Wis.) followed by stirring for 5 minutes. Subsequently 1.3 g of ammonium chloride (obtained from Fisher Scientific Co., Fairlawn, N.J.) was added to the mixture and it was stirred for another 5 minutes. To this formulation was added 0.2 g of butyl carbitol (obtained from Aldrich Chemical Co., Milwaukee, Wis.) followed by stirring for 5 minutes. The pH of the ink formulation was adjusted to 9.11 by the addition of 4.7 g of 3 molar hydrochloric acid. The final ink product, which was comprised of 5.46% by weight of Basacid X-34, 8% by weight of betaine, 0.98% by weight of N,N'-bis(3-aminopropyl)ethylenediamine, 0.2% butyl carbitol and 1.3% by weight of ammonium chloride in water, had a viscosity of 1.58 and surface tension of 57.0. The ink formulation was printed on the Xerox Image Series LX and Xerox 4024DP papers. The ink was 97% waterfast and 99% waterfast on the two papers respectively.

EXAMPLE III 30-1 (Ink contains only Pro-Jet Fast Black 2):

An ink composition was formulated as follows. In a bottle was measured 13.6 g of water and 15 9 of betaine (obtained from Aldrich Chemical Co., Milwaukee, Wis.). The mixture was magnetically stirred for 5 minutes. To this mixture was added 68 g of Pro-Jet Fast Black 2 (4 weight percent solid content, obtained from Zeneca, Inc., Wilmington, Del.) and the resulting mixture was stirred for another 5 minutes. The mixing was followed by the addition of 0.58 g of N,N'-bis (3-aminopropyl)ethylenediamine (obtained from Aldrich Chemical Co., Milwaukee, Wis.), followed by stirring for 5 minutes. Subsequently 1.12 g of ammonium chloride (obtained from Fisher Scientific Co., Fairlawn, N.J.) was added to the mixture and it was stirred for another 5 minutes. The pH of the ink formulation was adjusted to 9.5 by addition of 1.7 g of 3 molar hydrochloric acid. The final ink which was comprised of 2.72% Pro-Jet Fast Black 2, 15% by weight of betaine, 0.58% by weight of N,N'-bis(3-aminopropyl)ethylenediamine, and 1.12% by weight of ammonium chloride in water, had a viscosity of 1.63 and surface tension of 54.5. The ink formulation was printed on the Xerox Image Series LX paper and Xerox 4024DP paper. The ink was 98.5% waterfast (LX) and 99.3% (4024) waterfast on the two papers respectively.

EXAMPLE IV 31-3 (Mixture of Dyes):

An ink composition was formulated as follows. In a bottle was measured 32 g of water and 15 g of betaine (obtained from Aldrich Chemical Co., Milwaukee, Wis.). The mixture was magnetically stirred for 5 minutes. To this mixture was added 6.25 g of Basacid X-34 process black dye (33.5 weight percent solid content, obtained from BASF Wyandotte Corp., Holland, Mich.) and 45.5 g of Pro-Jet Fast Black 2 (4 weight percent solid content, obtained from Zeneca, Inc., Wilmington, Del.). The mixture was then stirred for another 5 minutes. The mixing, or stirring was followed by the addition of 1.3 g of ammonium chloride (obtained from Fisher Scientific Co., Fairlawn, N.J.) and stirred for 15 minutes. The resulting ink comprised of 2.09% by weight of Basacid X-34, 1.82% Pro-Jet Fast Black 2, 15% by weight of betaine, and 1.3% by weight of ammonium chloride in water, had a pH of 7.78, a viscosity of 1.6 and a surface tension of 62.7. The ink formulation was 96.9% waterfast on Xerox Corporation Image Series LX paper.

EXAMPLE V 33-1 (Mixture of Dyes):

An ink composition was formulated as follows. In a bottle was measured 30.48 g of water and 15 g of betaine (obtained from Aldrich Chemical Co., Milwaukee, Wis.). The mixture was magnetically stirred for 5 minutes. To this mixture was added 6.2 g of Basacid X-34 process black dye (33.5 weight percent solid content, obtained from BASF Wyandotte Corp., Holland, Mich.) and 45.5 g of Pro-Jet Fast Black 2 (4 weight percent solid content, obtained from Zeneca, Inc., Wilmington, Del.), followed by stirring for another 5 minutes. The stirring was then followed by the addition of 0.58 g of N,N'-bis(3-aminopropyl)ethylenediamine (obtained from Aldrich Chemical Co., Milwaukee, Wis.) and the resulting mixture was stirred for 5 minutes. Subsequently 1.12 9 of ammonium chloride (obtained from Fisher Scientific Co., Fairlawn, N.J.) was added to the mixture and it was stirred for another 5 minutes. The pH of the ink resulting was adjusted to 9.08 by the addition of 1.12 g of 3 molar hydrochloric acid. The final ink which was comprised of 2.077% by weight of Basacid X-34, 1.82% Pro-Jet Fast Black 2, 15% by weight of betaine, 0.58% by weight of N,N'-bis(3-aminopropyl)ethylenediamine and 1.12% by weight of ammonium chloride in water, had a viscosity of 1.66 and a surface tension of 60.2. The ink was then printed on the Xerox Image Series LX and Xerox 4024 DP papers. The ink was 95% waterfast (LX) and 101% (4024) waterfast on the two papers respectively.

EXAMPLE VI 33-2 (Mixture of Dyes):

An ink composition was formulated as follows. In a bottle was measured 28.2 g of water and 15 g of betaine (obtained from Aldrich Chemical Co., Milwaukee, Wis.). The mixture was magnetically stirred for 5 minutes. To this mixture was added 6.2 g of Basacid X-34 process black dye (33.5 weight percent solid content, obtained from BASF Wyandotte Corp., Holland, Mich.) and 45.5 g of Pro-Jet Fast Black 2 (4 weight percent solid content, obtained from Zeneca, Inc., Wilmington, Del.) and the mixture was stirred for another 5 minutes. This stirring was followed by the addition of 0.58 g of N,N'-bis(3-aminopropyl)ethylenediamine (obtained from Aldrich Chemical Co., Milwaukee, Wis.), followed by stirring for 5 minutes. Subsequently 1.12 g of ammonium chloride (obtained from Fisher Scientific Co., Fairlawn, N.J.) was added to the mixture and it was stirred for another 5 minutes. The pH of the ink formulation was adjusted to 8.8 by the addition of 3.36 g of 3 molar hydrochloric acid. The final ink product resulting which as comprised of 2.077% by weight of Basacid X-34, 1.82% Pro-Jet Fast Black 2, 15% by weight of betaine, 0.58% by weight of N,N'-bis(3-aminopropyl)ethylenediamine and 1.12% by weight of ammonium chloride in water, had a viscosity of 1.63 and a surface tension of 59.0. The ink was then printed on the Xerox Image Series LX and Xerox 4024DP paper. The ink was 95% waterfast (LX)and 99% waterfast on the two papers respectively.

EXAMPLE VII 33-3 (Mixture of Dyes):

An ink composition was formulated as follows. In a bottle was measured 25.3 g of water and 15 g of betaine (obtained from Aldrich Chemical Co., Milwaukee, Wis.). The mixture was magnetically stirred for 5 minutes. To this mixture was added 6.2 g of Basacid X-34 process black dye (33.5 weight percent solid content, obtained from BASF Wyandotte Corp., Holland, Mich.) and 45.5 g of Pro-Jet Fast Black 2 (4 weight percent solid content, obtained from Zeneca, Inc., Wilmington, Del.), followed by stirring the mixture for another 5 minutes. This stirring was followed by the addition of 0.58 g of N,N'-bis(3-aminopropyl)ethylenediamine (obtained from Aldrich Chemical Co., Milwaukee, Wis.) and the mixture resulting was stirred for 5 minutes. Subsequently 1.12 g of ammonium chloride (obtained from Fisher Scientific Co., Fairlawn, N.J.) was added to the mixture and it was stirred for another 5 minutes. The pH of the ink formulation was adjusted to 8.53 by addition of 6.26 g of 3 molar hydrochloric acid. The final ink product which contained 2.077% by weight of Basacid X-34, 1.82% Pro-Jet Fast Black 2, 15% by weight of betaine, 0.58% by weight of N,N'-bis(3-aminopropyl)ethylenediamine and 1.12% by weight of ammonium chloride in water, had a viscosity of 1.64 and a surface tension of 55.8. The ink formulation was printed on the Xerox Image Series LX paper and Xerox 4024DP paper. The ink was 99% waterfast (LX) and 100% waterfast on the two papers respectively.

EXAMPLE VIII 34 (Mixture of Dyes):

An ink composition was formulated as follows. In a bottle was measured 22.7 g of water and 15 9 of betaine (obtained from Aldrich Chemical Co., Milwaukee, Wis.). The mixture was magnetically stirred for 5 minutes. To this mixture was added 6.2 g of Basacid X-34 process black dye (33.5 weight percent solid content, obtained from BASF Wyandotte Corp., Holland, Mich.) and 45.5 g of Pro-Jet Fast Black 2 (4 weight percent solid content, obtained from Zeneca, Inc., Wilmington, Del.), followed by stirring for another 5 minutes. The stirring was followed by the addition of 0.58 g of N,N'-bis(3-aminopropyl)ethylenediamine (obtained from Aldrich Chemical Co., Milwaukee, Wis.) and stirred for 5 minutes. Subsequently 1.12 g of ammonium chloride (obtained from Fisher Scientific Co., Fairlawn, N.J.) was added to the mixture and the mixture resulting was stirred for another 5 minutes. The pH of the ink formulation was adjusted to 7.8 by the addition of 8.86 g of 3 molar hydrochloric acid. The final ink product contained 2.077% by weight of Basacid X-34, 1.82% Pro-Jet Fast Black 2, 15% by weight of betaine, 0.58% by weight of N,N'-bis(3-aminopropyl)ethylenediamine and 1.12% by weight of ammonium chloride in water, had a viscosity of 1.68 and a surface tension of 56.9. The ink was then printed on the Xerox Image Series LX paper and Xerox 4024DP paper. The ink was 97% waterfast (LX) and 100% waterfast on the two papers respectively.

EXAMPLE IX 35-1 (Mixture of Dyes):

An ink composition was formulated as follows. In a bottle was measured 8.8 g of water and 8 g of betaine (obtained from Aldrich Chemical Co., Milwaukee, Wis.). The mixture was magnetically stirred for 5 minutes. To this mixture was added 8.17 g of Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.). The mixture was stirred for another 5 minutes. The stirring was followed by the addition of 0.98 g of N,N'-bis(3-aminopropyl)ethylenediamine (obtained from Aldrich Chemical Co., Milwaukee, Wis.), and the mixture resulting was stirred for 5 minutes. Subsequently 1.3 g of ammonium chloride (obtained from Fisher Scientific Co., Fairlawn, N.J.) was added to the mixture and it was stirred for another 5 minutes. To this formulation was added 0.2 9 of butyl carbitol (obtained from Aldrich Chemical Co., Milwaukee, Wis.) and the mixture resulting was stirred for 5 minutes. The pH of the ink formulation was adjusted to 8.96 by addition of 4.6 g of 3 molar hydrochloric acid. The final ink product, which contained 2.74% by weight of Basacid X-34, 2.72% Pro-Jet Fast Black 2, 8% by weight of betaine, 0.98% by weight of N,N'-bis(3-aminopropyl) ethylenediamine, 0.2% by weight butyl carbitol and 1.3% by weight of ammonium chloride in water, had a viscosity of 1.57 and a surface tension of 56.6. The ink was then printed on the Xerox Image Series LX paper and Xerox 4024DP paper. The ink was 97.4% waterfast (LX) and 99.3% waterfast on the two papers respectively.

EXAMPLE X 35-2 (Mixture of Dyes):

An ink composition was formulated as follows. In a bottle was measured 6.95 g of water and 8 g of betaine (obtained from Aldrich Chemical Co., Milwaukee, Wis.). The mixture was magnetically stirred for 5 minutes. To this mixture was added 8.17 g of Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.). The mixture was then stirred for another 5 minutes. The mixing was followed by the addition of 0.98 g of N,N'-bis(3-aminopropyl)ethylenediamine (obtained from Aldrich Chemical Co., Milwaukee, Wis.) and the resulting mixture was then stirred for 5 minutes. Subsequently 1.3 g of ammonium chloride (obtained from Fisher Scientific Co., Fairlawn, N.J.) was added to the mixture and stirred for another 5 minutes. To this formulation was added 0.2 g of butyl carbitol (obtained from Aldrich Chemical Co., Milwaukee, Wis.) and it was stirred for 5 minutes. The pH of the ink formulation was adjusted to 8.47 by the addition of 6.4 g of 3 molar hydrochloric acid. The final ink product which contained 2.74% by weight of Basacid X-34, 2.72% Pro-Jet Fast Black 2, 8% by weight of betaine, 0.98% by weight of N,N'-bis(3-aminopropyl)ethylenediamine, 0.2% by weight butyl carbitol and 1.3% by weight of ammonium chloride in water, had a viscosity of 1.50 and surface tension of 57.1. The ink was then printed on the Xerox Image Series LX paper and Xerox 4024DP paper. The ink was 99.3% waterfast on both papers.

EXAMPLE XI 36-1 (Mixture of Dyes):

An ink composition was formulated as follows. In a bottle was measured 25.86 g of water and 10 g of betaine (obtained from Aldrich Chemical Co., Milwaukee, Wis.). The mixture was then magnetically stirred for 5 minutes. To this mixture was added 6.25 g of Basacid X-34 process black dye (33.5 weight percent solid content, obtained from BASF Wyandotte Corp., Holland, Mich.) and 52 g of Pro-Jet Fast Black 2 (4 weight percent solid content, obtained from Zeneca, Inc., Wilmington, Del.). The mixture resulting was stirred for another 5 minutes. This stirring was followed by the addition of 0.58 g of N,N'-bis(3-aminopropyl)ethylenediamine (obtained from Aldrich Chemical Co., Milwaukee, Wis.) and the resulting mixture was stirred for 5 minutes. Subsequently 1.12 g of ammonium chloride (obtained from Fisher Scientific Co., Fairlawn, N.J.) was added to the mixture and it was then stirred for another 5 minutes. The pH of the ink formulation was adjusted to 8.59 by the addition of 4.19 g of 3 molar hydrochloric acid. The ink product which contained 2.09% by weight of Basacid X-34, 2.08% Pro-Jet Fast Black 2, 10% by weight of betaine, 0.58% by weight of N,N'-bis(3-aminopropyl)ethylenediamine, and 1.12% by weight of ammonium chloride in water, had a viscosity of 1.51 and a surface tension of 53.3. The ink was then printed on the Xerox Image Series LX and Xerox 4024DP paper. The ink was 96.1% and 97.4% (4024) waterfast on the two papers respectively.

EXAMPLE XII 36-2 (Mixture of Dyes):

An ink composition was formulated as follows. In a bottle was measured 20.8 g of water and 10 g of betaine (obtained from Aldrich Chemical Co., Milwaukee, Wis.). The mixture was magnetically stirred for 5 minutes. To this mixture was added 6.25 g of Basacid X-34 process black dye (33.5 weight percent solid content, obtained from BASF Wyandotte Corp., Holland, Mich.) and 52 g of Pro-Jet Fast Black 2 (4 weight percent solid content, obtained from Zeneca, Inc., Wilmington, Del.). The mixture was then stirred for another 5 minutes. The stirring was followed by the addition of 0.98 g of N,N'-bis(3-aminopropyl)ethylenediamine (obtained from Aldrich Chemical Co., Milwaukee, Wis.) and it was stirred for 5 minutes. Subsequently 1.12 g of ammonium chloride (obtained from Fisher Scientific Co., Fairlawn, N.J.) was added to the mixture and it was stirred for another 5 minutes. The pH of the ink formulation, or mixture was adjusted to 8.63 by the addition of 8.87 g of 3 molar hydrochloric acid. The final ink product, which contained 2.09% by weight of Basacid X-34, 2.08% Pro-Jet Fast Black 2, 10% by weight of betaine, 0.98% by weight of N,N'-bis(3-aminopropyl)ethylenediamine, 0.2% by weight butyl carbitol and 1.12% by weight of ammonium chloride in water, had a viscosity of 1.48 and surface tension of 55.0. The ink resulting was printed on the Xerox Image Series LX and Xerox 4024DP paper. The ink was 96.7% and 99.3% waterfast on the two papers respectively.

EXAMPLE XIII 36-3 (Mixture of Dyes):

An ink composition was formulated as follows. In a bottle was measured 44.5 g of water and 10 g of betaine (obtained from Aldrich Chemical Co., Milwaukee, Wis.). The mixture was magnetically stirred for 5 minutes. To this mixture was added 9.37 g of Basacid X-34 process black dye (33.5 weight percent solid content, obtained from BASF Wyandotte Corp., Holland, Mich.) and 26 g of Pro-Jet Fast Black 2 (4 weight percent solid content, obtained from Zeneca, Inc., Wilmington, Del.). The mixture was left for stirring for another 5 minutes. The stirring was followed by the addition of 0.98 g of N,N'-bis(3-aminopropyl)ethylenediamine (obtained from Aldrich Chemical Co., Milwaukee, Wis.) and was stirred for 5 minutes. Subsequently 1.12 g of ammonium chloride (obtained from Fisher Scientific Co., Fairlawn, N.J.) was added to the mixture and it was stirred for another 5 minutes. The pH of the ink formulation was adjusted to 8.63 by the addition of 8.0 g of 3 molar hydrochloric acid. The final ink product which contained 3.14% by weight of Basacid X-34, 1.04% Pro-Jet Fast Black 2, 10% by weight of betaine, 0.98% by weight of N,N'-bis(3-aminopropyl)ethylenediamine, and 1.12% by weight of ammonium chloride in water, had a viscosity of 1.46 and surface tension of 59.0. The ink was then printed on the Xerox Image Series LX and Xerox 4024DP paper. The ink was 97.9% and 96.3% waterfast on the two papers respectively.

EXAMPLE XIV 36-4 (Mixture of Dyes):

An ink composition was formulated as follows. In a bottle was measured 18.13 g of water and 10 g of betaine (obtained from Aldrich Chemical Co., Milwaukee, Wis.). The mixture was magnetically stirred for 5 minutes. To this mixture was added 10.45 g of Basacid X-34 process black dye (33.5 weight percent solid content, obtained from BASF Wyandotte Corp., Holland, Mich.) and 52 g of Pro-Jet Fast Black 2 (4 weight percent solid content, obtained from Zeneca, Inc., Wilmington, DE). The mixture was then stirred for another 5 minutes. The stirring was followed by the addition of 0.98 g of N,N'-bis(3-aminopropyl)ethylenediamine (obtained from Aldrich Chemical Co., Milwaukee, Wis.) and it was stirred for 5 minutes. Subsequently 1.12 g of ammonium chloride (obtained from Fisher Scientific Co., Fairlawn, N.J.) was added to the mixture and it was stirred for another 5 minutes. The pH of the ink formulation was adjusted to 8.66 by the addition of 7.32 g of 3 molar hydrochloric acid. The final ink product which contained 3.50% by weight of Basacid X-34, 2.08% Pro-Jet Fast Black 2, 10% by weight of betaine, 0.98% by weight of N,N'-bis(3-aminopropyl) ethylenediamine, and 1.12% by weight of ammonium chloride in water, had a viscosity of 1.46 and a surface tension of 60.0. The ink formulation was printed on the Xerox Image Series LX and Xerox 4024DP paper. The ink was 96.8% and 97.2% waterfast on the two papers respectively.

EXAMPLE XV 40-2 (Mixture of Dyes):

An ink composition was formulated as follows. In a bottle was measured 8.9 g of water and 8 g of betaine (obtained from Aldrich Chemical Co., Milwaukee, Wis.). The mixture was magnetically stirred for 5 minutes. To this mixture was added 0.98 g of N,N'-bis(3-aminopropyl)ethylenediamine (obtained from Aldrich Chemical Co., Milwaukee, Wis.), and it was then stirred for 5 minutes. Subsequently 1.3 g of ammonium chloride (obtained from Fisher Scientific Co., Fairlawn, N.J.) was added to the mixture and it was stirred for another 5 minutes. To this formulation was added 0.2 g of butyl carbitol (obtained from Aldrich Chemical Co., Milwaukee, Wis.) and it was stirred for another 5 minutes. 4.45 g of 3 molar hydrochloric acid was added to the ink formulation and it was stirred for 10 minutes. To this mixture was added 8.17 g of Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.). It was left for stirring for another 5 minutes. The ink product which contained 2.74% by weight of Basacid X-34, 2.72% Pro-Jet Fast Black 2, 8% by weight of betaine, 0.98% by weight of N,N'-bis(3-aminopropyl) ethylenediamine, 0.2% by weight of butyl carbitol and 1.3% by weight of ammonium chloride in water, had pH of 9.03, a viscosity of 1.57 and a surface tension of 56.6. The ink was then printed on the Xerox Image Series LX and Xerox 4024 DP paper. The ink was 99.4% and 100% waterfast on the two papers respectively.

EXAMPLE XVI 40-3 (Mixture of Dyes):

An ink composition was formulated as follows. In a bottle was measured 12.2 g of water and 8 g of betaine (obtained from Aldrich Chemical Co., Milwaukee, Wis.). The mixture was magnetically stirred for 5 minutes. To this mixture was added 8.17 g of Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.). The mixture was allowed to stir for another 5 minutes. The stirring was followed by the addition of 0.98 g of N,N'-bis(3-aminopropyl)ethylenediamine (obtained from Aldrich Chemical Co., Milwaukee, Wis.) and the resulting mixture was stirred for 5 minutes. Subsequently 1.3 g of ammonium chloride (obtained from Fisher Scientific Co., Fairlawn, N.J.) was added to the mixture and it was stirred for another 5 minutes. To this formulation was added 0.2 g of butyl carbitol (obtained from Aldrich Chemical Co., Milwaukee, Wis.) and the resulting mixture was stirred for 5 minutes. The pH of the ink formulation was adjusted to 8.77 by the addition of 1.15 g of 3 molar phosphorous acid. The final ink product which contained 2.74% by weight of Basacid X-34, 2.72% Pro-Jet Fast Black 2, 8% by weight of betaine, 0.98% by weight of N,N'-bis(3-aminopropyl)ethylenediamine, 0.2% by weight of butyl carbitol and 1.3% by weight of ammonium chloride in water, had a viscosity of 1.56 and surface tension of 52.3. The ink was printed on the Xerox Image Series LX and Xerox 4024 DP paper, and was 100% and 102% waterfast on the two papers respectively.

EXAMPLE XVII 41-1 (Mixture of Dyes):

An ink composition was formulated as follows. In a bottle was measured 3.45 g of water and 8 g of betaine (obtained from Aldrich Chemical Co., Milwaukee, Wis.). The mixture was magnetically stirred for 5 minutes. To this mixture was added 5 g of 3-methyl-2-oxazolidinone (obtained from Aldrich Chemical Co., Milwaukee, Wis.) and the mixture resulting was stirred for another 5 minutes. 8.17 g Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.) was added to this mixture and it was left for stirring for another 5 minutes. The stirring was followed by the addition of 0.98 g of N,N'-bis(3-aminopropyl)ethylenediamine (obtained from Aldrich Chemical Co., Milwaukee, Wis.) and it was stirred for 5 minutes. Subsequently 1.3 g of ammonium chloride (obtained from Fisher Scientific Co., Fairlawn, N.J.) was added to the mixture and it was stirred for another 5 minutes. To this formulation was added 0.2 g of butyl carbitol (obtained from Aldrich Chemical Co., Milwaukee, Wis.) and it was stirred for 5 minutes. The pH of the ink formulation was adjusted to 9.03 by the addition of 4.9 g of 3 molar hydrochloric acid. The final ink product comprised of 2.74% by weight of Basacid X-34, 2.72% Pro-Jet Fast Black 2, 8% by weight of betaine, 5% by weight of 3-methyl-2-oxazolidinone, 0.98% by weight of N,N'-bis(3-aminopropyl)ethylenediamine, 0.2% by weight of butyl carbitol and 1.3% by weight of ammonium chloride in water, had a viscosity of 1.65 and a surface tension of 51. The ink was then printed on the Xerox Image Series LX and Xerox 4024 DP paper, and was 100% and 102% waterfast on the two papers respectively.

EXAMPLE XVIII 44-1 (Mixture of Dyes):

An ink composition was formulated as follows. In a bottle was measured 9.35 g of water and 8 g of 3-methyl-2-oxazolidinone (obtained from Aldrich Chemical Co., Milwaukee, Wis.) and the mixture resulting was then magnetically stirred for 5 minutes. To this mixture was added 8.17 g of Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.) and it was left for stirring for another 5 minutes. The stirring was followed by the addition of 0.98 g of N,N'-bis(3-aminopropyl)ethylenediamine (obtained from Aldrich Chemical Co., Milwaukee, Wis.) and it was stirred for 5 minutes. Subsequently 1.3 g of ammonium chloride (obtained from Fisher Scientific Co., Fairlawn, N.J.) was added to the mixture and the mixture was stirred for another 5 minutes. To this formulation was added 0.2 9 of butyl carbitol (obtained from Aldrich Chemical Co., Milwaukee, Wis.) and the resulting mixture was stirred for 5 minutes. The pH of the ink formulation was adjusted to 8.95 by the addition of 4.0 g of 3 molar hydrochloric acid. The final ink product comprised of 2.74% by weight of Basacid X-34, 2.72% Pro-Jet Fast Black 2, 8% by weight of 3-methyl-2-oxazolidinone, 0.98% by weight of N,N'-bis(3-aminopropyl)ethylenediamine, 0.2% by weight of butyl carbitol and 1.3% by weight of ammonium chloride in water, had a viscosity of 1.52 and a surface tension of 53.0. The ink was then printed on the Xerox image Series LX and Xerox 4024 DP paper, and was 99.3% and 100% waterfast on the two papers respectively.

EXAMPLE XIX 44-2 (Mixture of Dyes):

An ink composition was formulated as follows. In a bottle was measured 6.45 g of water and 5 g of 3-methyl-2-oxazolidinone (obtained from Aldrich Chemical Co., Milwaukee, Wis.) and the mixture resulting was magnetically stirred for 5 minutes. 5 Grams of trimethylolpropane (obtained from Aldrich Chemical Co., Milwaukee, Wis.) was added to this mixture and it was stirred for another 5 minutes. To this mixture was added 8.17 9 of Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.) and it was left for stirring for another 5 minutes. The stirring was followed by the addition of 0.98 9 of N,N'-bis(3-aminopropyl)ethylenediamine (obtained from Aldrich Chemical Co., Milwaukee, Wis.) and the mixture resulting was stirred for 5 minutes. Subsequently 1.3 g of ammonium chloride (obtained from Fisher Scientific Co., Fairlawn, N.J.) was added to the mixture and it stirred for another 5 minutes. To this formulation was added 0.2 g of butyl carbitol (obtained from Aldrich Chemical Co., Milwaukee, Wis.) and it was stirred for 5 minutes. The pH of the ink formulation was adjusted to 8.97 by addition of 4.9 g of 3 molar hydrochloric acid. The final ink product comprised of 2.74% by weight of Basacid X-34, 2.72% Pro-Jet Fast Black 2, 5% by weight of trimethylolpropane, 5% by weight of 3-methyl-2-oxazolidinone, 0.98% by weight of N,N'-bis(3-aminopropyl)ethylenediamine, 0.2% by weight of butyl carbitol and 1.3% by weight of ammonium chloride in water, had a viscosity of 1.72 and a surface tension of 51.7. The ink formulation was printed on the Xerox Image Series LX paper and Xerox 4024 DP paper, and was 99.3% and 99.3% waterfast on the two papers respectively.

EXAMPLE XX 46-1 (Mixture of Dyes):

An ink composition was formulated as follows. In a bottle was measured 12.7 g of water and 10.5 g of betaine (obtained from Aldrich Chemical Co., Milwaukee, Wis.). The mixture was magnetically stirred for 5 minutes. To this mixture was added 7.5 g of Basacid X-34 process black dye (33.5 weight percent solid content, obtained from BASF Wyandotte Corp., Holland, Mich.) and 62.5 g of Pro-Jet Fast Black 2 (4 weight percent solid content, obtained from Zeneca, Inc., Wilmington, Del.). The resulting mixture was stirred for another 5 minutes. The stirring was followed by the addition of 0.7 g of N,N'-bis(3-aminopropyl) ethylenediamine (obtained from Aldrich Chemical Co., Milwaukee, Wis.) and it was stirred for 5 minutes. Subsequently 2.0 g of ammonium chloride (obtained from Fisher Scientific Co., Fairlawn, N.J.) was added to the mixture and it was stirred for another 5 minutes. To this formulation was added 0.2 9 of butyl carbitol (obtained from Aldrich Chemical Co., Milwaukee, Wis.) and it was stirred for 5 minutes. The pH of the ink formulation was adjusted to 8.74 by the addition of 3.9 g of 3 molar hydrochloric acid. The final ink product composed of 2.51 % by weight of Basacid X-34, 2.50% Pro-Jet Fast Black 2, 10.5% by weight of betaine, 5% by weight of 3-methyl-2-oxazolidinone, 0.70% by weight of N,N'-bis(3-aminopropyl)ethylenediamine, 0.2% by weight of butyl carbitol, and 2.0% by weight of ammonium chloride in water, had a viscosity of 1.69 and a surface tension of 51.5. The ink formulation was printed on the Xerox Image Series LX and Xerox 4024 DP papers, and was 98% and 100% waterfast on the two papers respectively.

EXAMPLE XXI 46-2 (Mixture of Dyes):

An ink composition was formulated as follows. In a bottle was measured 9.94 g of water and 12.8 g of betaine (obtained from Aldrich Chemical Co., Milwaukee, Wis.). The mixture was magnetically stirred for 5 minutes. To this mixture was added 10.23 g of Basacid X-34 process black dye (33.5 weight percent solid content, obtained from BASF Wyandotte Corp., Holland, Mich.) and 65 g of Pro-Jet Fast Black 2 (4 weight percent solid content, obtained from Zeneca, Inc., Wilmington, Del.). The resulting mixture was stirred for another 5 minutes. Subsequently 2.0 g of ammonium chloride (obtained from Fisher Scientific Co., Fairlawn, N.J.) was added to the mixture and stirred for another 5 minutes. To this formulation was added 0.03 g of butyl carbitol (obtained from Aldrich Chemical Co., Milwaukee, Wis.) and it was stirred for 5 minutes. The final ink product, composed of 3.43% by weight of Basacid X-34, 2.6% Pro-Jet Fast Black 2, 12.8% by weight of betaine, 5% by weight of 3-methyl-2-oxazolidinone, 0.03% by weight of butyl carbitol and 2.0% by weight of ammonium chloride in water, had a pH of 7.63, a viscosity of 1.76 and surface tension of 60.4. The ink formulation was printed on the Xerox Image Series LX paper and Xerox 4024 Dp paper, and was 93.5% and 97.8% waterfast on the two papers respectively.

EXAMPLE XXII 46-3 (Mixture of Dyes):

An ink composition was formulated as follows. In a bottle was measured 8.44 g of water and 12.8 g of betaine (obtained from Aldrich Chemical Co., Milwaukee, Wis.). The mixture was magnetically stirred for 5 minutes. To this mixture was added 10.23 g of Basacid X-34 process black dye (33.5 weight percent solid content, obtained from BASF Wyandotte Corp., Holland, Mich.) and 65 g of Pro-Jet Fast Black 2 (4 weight percent solid content, obtained from Zeneca, Inc., Wilmington, Del.). The resulting mixture was stirred for another 5 minutes. Subsequently 2.0 g of ammonium chloride (obtained from Fisher Scientific Co., Fairlawn, N.J.) was added to the mixture and it was stirred for another 5 minutes. To this formulation was added 0.03 g of butyl carbitol (obtained from Aldrich Chemical Co., Milwaukee, Wis.) and it was stirred for 5 minutes. 1.5 g of sodium hydroxide was added to this mixture and stirred for 15 minutes. The final ink product composed of 3.43% by weight of Basacid X-34, 2.6% Pro-Jet Fast Black 2, 12.8% by weight of betaine, 0.03% by weight of butyl carbitol, 1.5% sodium hydroxide and 2.0% by weight of ammonium chloride in water, had a pH of 8.66, a viscosity of 1.76 and surface tension of 58.8. The ink was printed on the Xerox Image Series LX paper and Xerox 4024 DP paper, and was 91 % and 97.2% waterfast on the two papers respectively.

EXAMPLE XXIII 47-1 (Mixture of Dyes):

An ink composition was formulated as follows. In a bottle was measured 14.33 g of water and 8 g of betaine (obtained from Aldrich Chemical Co., Milwaukee, Wis.). The mixture was magnetically stirred for 5 minutes. To this mixture was added 8.17 g Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.). The resulting mixture was stirred for another 5 minutes. Subsequently 1.3 g of ammonium chloride (obtained from Fisher Scientific Co., Fairlawn, N.J.) was added to the mixture and stirred for another 5 minutes. To this formulation was added 0.2 g of butyl carbitol (obtained from Aldrich Chemical Co., Milwaukee, Wis.) and it was stirred for 5 minutes. The final ink product comprised of 2.74% by weight of Basacid X-34, 2.72% Pro-Jet Fast Black 2, 8% by weight of betaine, 0.2% by weight of butyl carbitol and 1.3% by weight of ammonium chloride in water, had a pH of 7.66, a viscosity of 1.55 and a surface tension of 55.1. The ink was then printed on the Xerox Image Series LX paper and Xerox 4020 paper, and was 95% and 98.5% waterfast on the two papers respectively.

EXAMPLE XXIV 47-2 (Mixture of Dyes):

An ink composition was formulated as follows. In a bottle was measured 13.12 g of water and 8 g of betaine (obtained from Aldrich Chemical Co., Milwaukee, Wis.). The mixture was magnetically stirred for 5 minutes. To this mixture was added 8.17 g Basacid X-34 process black dye (33.5 weight percent solid content, obtained from BASF Wyandotte Corp., Holland, Mich.) and 68 g of Pro-Jet Fast Black 2 (4 weight percent solid content, obtained from Zeneca, Inc., Wilmington, Del.). The resulting mixture was stirred for another 5 minutes. Subsequently 1.3 g of ammonium chloride (obtained from Fisher Scientific Co., Fairlawn, N.J.) was added to the mixture and it was stirred for another 5 minutes. To this formulation was added 0.2 g of butyl carbitol (obtained from Aldrich Chemical Co., Milwaukee, Wis.) and it was stirred for 5 minutes. 1.21 g of sodium hydroxide was added and it (the resulting mixture) was stirred for 10 minutes. The final ink product composed of 2.74% by weight of Basacid X-34, 2.72% Pro-Jet Fast Black 2, 8% by weight of betaine, 0.2% by weight of butyl carbitol, 1.21 % by weight of sodium hydroxide and 1.3% by weight of ammonium chloride in water, had a pH of 8.70, a viscosity of 1.54 and a surface tension of 55.4. The ink was then printed on the Xerox Image Series LX paper and Xerox 4020 paper. The ink was 96% and 97.8% waterfast on the two papers respectively.

Table 1 demonstrates for example the advantages of using mixtures of dyes in combination with a waterfastness additive such as N,N'-bis(3-aminopropyl)ethylenediamine to achieve better overall print quality. In the first three samples, FL24469-28-1, 28-3 and 30-1, only one dye was used with the waterfast additive to prepare the invention inks. The first ink had poor edge raggedness (MFLEN), intercolor bleed (ICB) and the waterfastness on the Image Series LX paper was 94%. The second and third inks had low optical density (OD) and less than perfect intercolor bleed. Samples 31-3, 47-1 and 47-2 contains mixtures of dyes, at least one of the dyes having a waterfastness greater than 90 percent but no waterfast additive. The waterfastness was less than 100 percent and the print quality was not as good as compared to the samples that contain both the mixture of dyes and the waterfastness additive. Examples VII, X, XV, XVI, XVII, XVIII, XIX, XX are examples of benchmark print quality for which the waterfastness is above 99%. In all situations, except Example VII, the ratio of the two dyes is 1:1 by weight. In summary, optimum performance is achieved at equal ratio of the two dyes and in the presence of about 0.5 to 1.0 percent N,N'-bis(3-aminopropyl)ethylenediamine and with the pH of the ink preferably being between 8.4 and 9.1. Using the waterfast dyes at levels higher than 50% of the total amount of dye in the ink can produce inks with a less than neutral hue and/or of lower optical density.

TABLE 1

Printing Properties of the Formulated Inks

| Ink Code | OD (7NT) | OD (18NT) | MFLEN (7NT) | MFLEN (18NT) | ICB (7NT) | ICB (18NT) | WF 7NT | WF 18NT |
|---|---|---|---|---|---|---|---|---|
| I) FL24469-28-1 | 1.43 | 1.44 | 11.1 | 7.90 | 23.10 | 24.9 | 94.0 | 100.0 |
| II) FL24469-28-3 | 1.38 | 1.33 | 1.45 | 2.55 | 4.25 | 8.85 | 97.0 | 99.0 |
| III) FL24469-30-1 | 1.35 | 1.34 | 0.40 | 0 | 1.65 | 5.20 | 98.5 | 99.3 |
| IV) FL24469-31-3 | 1.31 | | 3.95 | | 3.35 | | 96.9 | |
| V) FL24469-33-1 | 1.31 | 1.26 | 0.10 | 0.25 | 3.40 | 4.10 | 95.0 | 101.6 |
| VI) FL24469-33-2 | 1.44 | 1.44 | 0.10 | 0.20 | 3.50 | 5.40 | 95.0 | 99.0 |
| VII) FL24469-33-3 | 1.47 | 1.44 | 0.45 | 0 | 1.90 | 3.80 | 99.0 | 100.0 |
| VIII) FL24469-33-4 | 1.51 | 1.42 | 0 | 0.30 | 1.90 | 1.70 | 97.0 | 100.0 |
| IX) FL24469-35-1 | 1.55 | 1.51 | 0.30 | 0.05 | 2.20 | 1.90 | 97.4 | 99.3 |
| X) FL24469-35-2 | 1.47 | 1.49 | 0.25 | 0 | 1.45 | 1.85 | 99.3 | 99.3 |
| XI) FL24469-36-1 | 1.54 | 1.56 | 0 | 0 | 2.60 | 5.00 | 96.1 | 97.4 |
| XII) FL24469-36-2 | 1.50 | 1.40 | 0 | 0 | 2.30 | 4.80 | 96.7 | 99.3 |
| XIII) FL24469-36-3 | 1.40 | 1.36 | 0 | 0.05 | 5.10 | 5.80 | 97.9 | 96.3 |
| XIV) FL24469-36-4 | 1.54 | 1.45 | 0 | 0.20 | 2.20 | 4.90 | 96.8 | 97.2 |
| XV) FL24469-40-2 | 1.56 | 1.53 | 0.15 | 0.10 | 1.70 | 2.85 | 99.4 | 100.6 |
| XVI) FL24469-40-3 | 1.53 | 1.49 | 0.05 | 0.20 | 2.95 | 3.60 | 99.3 | 100.6 |
| XVII) FL24469-41-1 | 1.48 | 1.39 | 1.40 | 0.60 | 3.40 | 3.10 | 100.0 | 102.8 |
| XVIII) FL24469-44-1 | 1.43 | 1.38 | 1.50 | 1.55 | 1.80 | 4.10 | 99.3 | 100.0 |
| XIX) FL24469-44-2 | 1.50 | 1.42 | 2 | 1.10 | 3.50 | 4.50 | 99.3 | 99.3 |

TABLE 1-continued

Printing Properties of the Formulated Inks

| Ink Code | OD (7NT) | OD (18NT) | MFLEN (7NT) | MFLEN (18NT) | ICB (7NT) | ICB (18NT) | WF 7NT | WF 18NT |
|---|---|---|---|---|---|---|---|---|
| XX) FL24469-46-1 | 1.55 | 1.54 | 0.10 | 0.15 | 1.00 | 2.00 | 98.0 | 100.0 |
| XXI) FL24469-46-2 | 1.40 | 1.37 | 0.50 | 5.20 | 3.20 | 1.00 | 93.5 | 97.8 |
| XXII) FL24469-46-3 | 1.47 | 1.44 | 0 | 0.20 | 1.60 | 1.10 | 91.0 | 97.2 |
| XXIII) FL24469-47-1 | 1.45 | 1.34 | 4.10 | 2.80 | 8.20 | 6.00 | 95.0 | 98.5 |
| XXIV) FL24469-47-2 | 1.51 | 1.38 | 1.40 | 0.50 | 3.80 | 4.50 | 96.0 | 97.8 |

7NT (Xerox Image Senes LX)
18NT (Xerox 4020)

Other modifications of the present invention may occur to those of ordinary skill in the art based upon a review of the present application and these modifications, including equivalents thereof, are intended to be included within the scope of the present invention and the claims.

What is claimed is:

1. A printing process which comprises incorporating into an acoustic ink jet printer an ink comprised of a mixture of black colorants, a vehicle, and N,N'-bis(3-aminopropyl) ethylenediamine, and causing droplets of the ink to be ejected in imagewise pattern onto a substrate.

2. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a mixture of black dyes, a vehicle, betaine and N,N'-bis(3-aminopropyl)ethylenediamine, and which ink possesses a viscosity of from about 1 centipoise to about 20 centipoise, at a temperature of from about 25° C. to about 50° C. and (b) causing droplets of said ink to be ejected onto a recording sheet in an imagewise pattern.

3. A process in accordance with claim 1 wherein said ink is comprised of a mixture of two black dyes.

4. A process in accordance with claim 3 wherein the mixture contains a first black dye in an amount of from about 40 to about 60 weight percent, and a second black dye in an amount of from about 60 to about 40 weight percent.

5. A process in accordance with claim 3 wherein the mixtures of dyes are present in the ink in an amount of from about 1 to about 20 weight percent, and the betaine is present in an amount of from about 1 to about 20 weight percent.

6. A process in accordance with claim 3 wherein the black mixture is comprised of

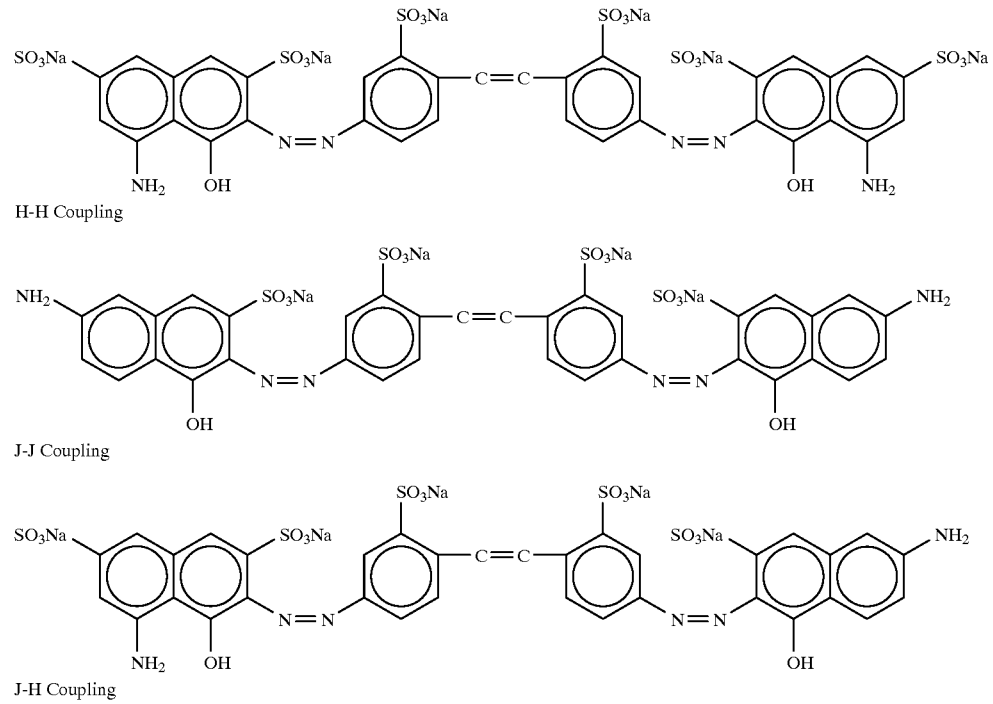

H-H Coupling

J-J Coupling

J-H Coupling

-continued

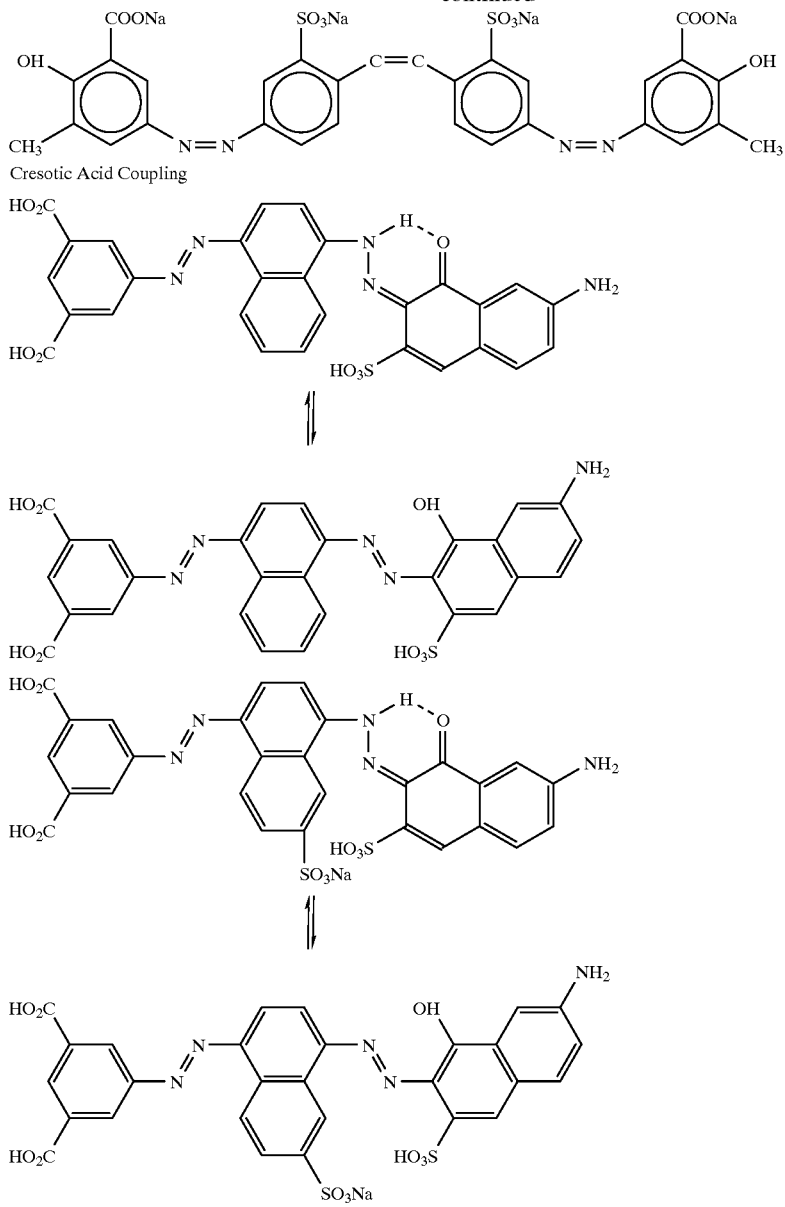

7. A process in accordance with claim 1 wherein said ink vehicle is water.

8. A process in accordance with claim 7 wherein the ink vehicle is present in the amount of from about 50 to about 95 weight percent, and further comprising betaine present in an amount of from about 0.5 to about 10 weight percent.

9. A process in accordance with claim 3 wherein there is further added to the ink additives of glycols, humectants and biocides.

* * * * *